(12) United States Patent
Hung et al.

(10) Patent No.: US 11,687,831 B1
(45) Date of Patent: Jun. 27, 2023

(54) METHOD, PRODUCT, AND APPARATUS FOR A MULTIDIMENSIONAL PROCESSING ARRAY FOR HARDWARE ACCELERATION OF CONVOLUTIONAL NEURAL NETWORK INFERENCE

(71) Applicant: Cadence Design Systems, Inc., San Jose, CA (US)

(72) Inventors: Ngai Ngai William Hung, San Jose, CA (US); Dhiraj Goswami, Wilsonville, OR (US); Michael Patrick Zimmer, Chicago, IL (US); Yong Liu, Cupertino, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 301 days.

(21) Appl. No.: 16/946,674

(22) Filed: Jun. 30, 2020

(51) Int. Cl.
*G06N 20/00* (2019.01)

(52) U.S. Cl.
CPC .................................. *G06N 20/00* (2019.01)

(58) Field of Classification Search
CPC ............................. G06N 20/00; G06F 15/8046
See application file for complete search history.

(56) References Cited

U.S. PATENT DOCUMENTS

| | | | |
|---|---|---|---|
| 5,267,185 A | 11/1993 | Akabane et al. | |
| 7,945,528 B2 | 5/2011 | Cytron et al. | |
| 9,128,697 B1 | 9/2015 | Potter et al. | |
| 9,330,167 B1 | 5/2016 | Pendar | |
| 10,643,705 B2 | 5/2020 | Choi et al. | |
| 10,817,260 B1 | 10/2020 | Huang et al. | |
| 2010/0306300 A1 | 12/2010 | Lu et al. | |
| 2016/0342890 A1 | 11/2016 | Young | |
| 2018/0165574 A1 | 6/2018 | Young et al. | |
| 2018/0307968 A1 | 10/2018 | Bose et al. | |
| 2018/0314671 A1* | 11/2018 | Zhang | G06N 3/063 |
| 2019/0012296 A1 | 1/2019 | Hsieh et al. | |

(Continued)

OTHER PUBLICATIONS

Yin et al., "A High Energy Efficient Reconfigurable Hybrid Neural Network Processor for Deep Learning Applications", Dec. 2017, pp. 968-982 (Year: 2017).*

(Continued)

*Primary Examiner* — Thaddeus J Plecha
(74) *Attorney, Agent, or Firm* — Vista IP Law Group, LLP

(57) ABSTRACT

An approach includes receiving a machine learning processing job, executing the machine learning processing job using parallel processing of multiple output pixels each cycle by walking data across processing elements with broadcast weights within regions and executing parallel multiplication operations, and generating an output indicating whether the machine learning processing job was successful or failed. In some embodiments, a schedule of actions is generated for respective machine learning processing jobs. The schedule of actions may include any of a plurality of shift operations in a many to many arrangement or a one to many arrangement, shifting data across region boundaries, fetching data and weights from a memory and distribution thereof to a plurality of regions (e.g., weights are distributed to respective weight memories which subsequently broadcasts those weights in a specified order based on a schedule of actions, and where data is distributed to respective processing elements).

20 Claims, 16 Drawing Sheets

(56) References Cited

U.S. PATENT DOCUMENTS

| | | | |
|---|---|---|---|
| 2019/0042237 | A1 | 2/2019 | Azizi et al. |
| 2019/0236049 | A1* | 8/2019 | Vantrease ............... G06N 3/063 |
| 2019/0244086 | A1 | 8/2019 | Franca-neto |
| 2020/0097442 | A1* | 3/2020 | Yaakov et al. ....... G06F 15/8046 |
| 2020/0244282 | A1 | 7/2020 | Bajic et al. |
| 2020/0410036 | A1 | 12/2020 | Huynh et al. |
| 2021/0035258 | A1 | 2/2021 | Ray et al. |
| 2021/0064992 | A1 | 3/2021 | Park et al. |
| 2021/0124794 | A1 | 4/2021 | Nair et al. |
| 2021/0157767 | A1 | 5/2021 | Ross et al. |
| 2021/0256360 | A1* | 8/2021 | Nam ..................... G06N 3/0481 |
| 2021/0271451 | A1* | 9/2021 | Nair ........................ G06N 3/063 |
| 2021/0303909 | A1 | 9/2021 | Gunnam et al. |
| 2021/0326686 | A1* | 10/2021 | Abdelaziz ........... G06F 9/30032 |
| 2021/0377122 | A1 | 12/2021 | Pennello |
| 2022/0076066 | A1* | 3/2022 | Forgeat ................ G06K 9/6263 |
| 2022/0129521 | A1 | 4/2022 | Surti et al. |

OTHER PUBLICATIONS

Ankur6ue. (Jul. 30, 2018). Understanding Matrix Multiplication on a Weight-Stationary Systolic Architecture. Retrieved from Telesens: http://www.telesens.co/2018/07/30/systolic-architectures/.

Brownlee, J. (Jul. 23, 2018). When to Use MLP, CNN, and RNN Neural Networks. Retrieved from Machine Learning Mastery: https://machinelearningmastery.com/when-to-use-mlp-cnn-and-rnn-neural-networks/.

So, G. (Mar. 28, 2019). Should we Abandon LSTM for CNN? Retrieved from Medium: https://medium.com/ai-ml-at-symantec/should-we-abandon-lstm-for-cnn-83accaeb93d6.

Non-Final Office Action for U.S. Appl. No. 16/946,675 dated Jun. 17, 2022.

Non-Final Office Action for U.S. Appl. No. 16/946,672 dated Jun. 8, 2022.

Non-Final Office Action for U.S. Appl. No. 16/946,671 dated Mar. 2, 2022.

Yin et al., "Parana: A Parallel Neural Architecture Considering Thermal Problem of 3D Stacked Memory", IEEE Transactions on Parallel and Distributed Systems, vol. 30, No. 1, Jan. 2019, pp. 146-160.

Ahmad, S., et al., "Xilinx First 7nm Device: Versal AI Core (VC1902)," Xilinx Inc, dated Aug. 20, 2019.

Prieto, R., "Implementation of an 8-bit Dynamic Fixed-Point Convolutional Neural Network for Human Sign Language Recognition on a Xilinx FPGA Board," Department of Electrical and Information Technology Lund University, dated Mar. 17, 2019.

Jawandhiya, P., "Hardware Design for Machine Learning," International Journal of Artificial Intelligence and Applications (IJAIA), vol. 9, No. 1, dated Jan. 2018.

"Dell EMC Ready Solutions for AI—Deep Learning with Intel," Measuring performance and capability of deep learning use cases, Dell EMC, dated Jun. 2019.

Mayannavar, S., et al., "Hardware Accelerators for Neural Processing," International Journal of Computer Information Systems and Industrial Management Applications, ISSN 2150-7988 vol. 11 (2019) pp. 046-054, dated Apr. 17, 2019.

Final Office Action dated Sep. 1, 2022 for U.S. Appl. No. 16/946,671.

Shao, "Lab 2: Systolic Arrays and Dataflows", UC Berkeley, Feb. 10, 2020, pp. 1-15. Retrieved from the Internet < URL: https://inst.eecs.berkeley.edu/~ee290-2/sp20/ >.

Github, "Gemmini—Berkeley's Systolic Array Generator", Apr. 26, 2020, 7 pages. Retrieved from the Internet < URL: https://web.archive.org/web/20200426231646/https://github.com/ucb-bar/gemmini >.

Su et al., "A Comparison of Single-Buffer and Double-Buffer Design in a Systolic Array Generator", Journal of Physics: Conference Series 1693, Nov. 9, 2020, pp. 1-6.

Non-Final Office Action dated Jul. 25, 2022 U.S. Appl. No. 16/946,673.

Kung et al., "Adaptive Tiling: Applying Fixed-size Systolic Arrays to Sparse Convolutional Neural Networks", 2018 24th International Conference on Pattern Recognition (ICPR) Beijing, China, (Aug. 20-24, 2018).

Notice of Allowance dated Nov. 1, 2022 for U.S. Appl. No. 16/946,675.

Final Office Action dated Nov. 2, 2022 for U.S. Appl. No. 16/946,673.

Non-Final Office Action for U.S. Appl. No. 16/946,670 dated Nov. 9, 2022.

Notice of Allowance for U.S. Appl. No. 16/946,672 dated Jan. 9, 2023.

Notice of Allowance for U.S. Appl. No. 16/946,673 dated Feb. 1, 2023.

\* cited by examiner

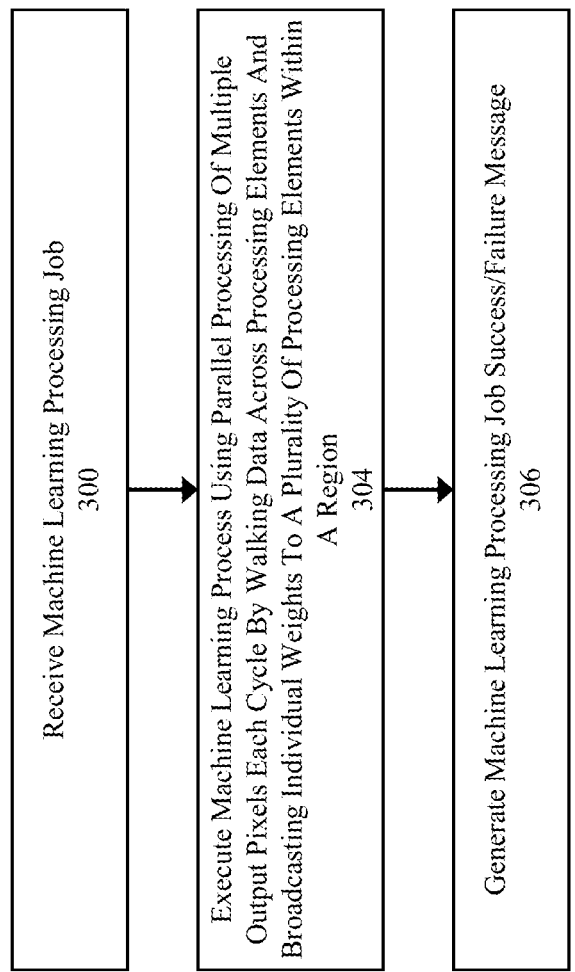

METHOD, PRODUCT, AND APPARATUS FOR A MULTIDIMENSIONAL PROCESSING ARRAY FOR HARDWARE ACCELERATION OF CONVOLUTIONAL NEURAL NETWORK INFERENCE

RELATED APPLICATIONS

The present application is related to co-pending U.S. patent application Ser. No. 16/946,675 titled "METHOD, PRODUCT, AND APPARATUS FOR VARIABLE PRECISION WEIGHT MANAGEMENT FOR NEURAL NETWORKS", now issued as U.S. Pat. No. 11,615,320, U.S. patent application Ser. No. 16/946,673 titled "METHOD, PRODUCT, AND APPARATUS FOR A MACHINE LEARNING PROCESS LEVERAGING INPUT SPARSITY ON A PIXEL BY PIXEL BASIS", U.S. patent application Ser. No. 16/946,672 titled "METHOD, PRODUCT, AND APPARATUS FOR A MACHINE LEARNING PROCESS USING DYNAMIC REARRANGEMENT OF SPARSE DATA AND CORRESPONDING WEIGHTS", U.S. patent application Ser. No. 16/946,671 titled "METHOD, PRODUCT, AND APPARATUS FOR A MACHINE LEARNING PROCESS USING A SYSTOLIC ARRAY WITH MULTIMODAL WEIGHT MANAGEMENT", U.S. patent application Ser. No. 16/946,670 titled "METHOD, PRODUCT, AND APPARATUS FOR A MACHINE LEARNING PROCESS USING WEIGHT SHARING WITHIN A SYSTOLIC ARRAY HAVING REDUCED MEMORY BANDWIDTH" filed on even date herewith, which are hereby incorporated by reference in their entirety.

FIELD

This disclosure pertains to determining inferences using convolutional neural networks.

BACKGROUND

The increase of the computing capacity of computing devices and the interconnection of those devices has enabled multiple uses for artificial intelligence. For instance, artificial intelligence can now be found in digital personal assistants and various informational websites. Additionally, artificial intelligence has seen substantial use in image processing fields, such as in recognition of objects (e.g., an AI system in a car recognizing a pedestrian) and other types of image processing.

Various types of techniques have been employed to implement AI and machine learning. For example, one particularly dominant approach to AI is the processing of data using neural networks such as those used in deep learning techniques. Neural networks generally comprise a logical collection of logical nodes connected to other nodes by one or more weighted connections. These logical nodes are arranged in logical layers where each node is associated with the performance of the same type of operations and a plurality of nodes are provided in each convolution layer. For instance, one common type of operation used for convolutional neural networks are multiply accumulate operations.

However, it is widely accepted that traditional serial processing devices, such as those used in cellphones and personal computers are not well suited for performing convolutional neural network processing due to the scale of the computations. To address this, systolic arrays are widely used in or as artificial intelligence hardware accelerators. These systolic arrays generally provide a somewhat efficient way to perform the matrix multiplication in hardware. Despite this, systolic arrays nonetheless still have some drawbacks that limit their performance. For instance, the latency for a systolic array depends on the dimensions of the data matrix, non-standard data matrix dimensions result in poor multiplier unit utilization and wasted memory bandwidth, systolic arrays require additional overhead to implement matrix multiplications, systolic arrays do not have direct support for sparsity, and as systolic arrays are scaled up in size the relative performance return decreases.

To illustrate, using systolic array to implement convolution with kernel size larger than 1 requires duplication of the input data shape or reshape it before sending it to the systolic array. This is because one pixel in the data is within the neighborhood of all its neighbors' kernels.

Thus, what is needed is an improved method, product, and apparatus for convolutional neural network processing that does not suffer in the same degree or in the same way as a systolic array.

SUMMARY

Embodiments of the present invention provide an approach for a method, product, and apparatus for a multidimensional processing array for hardware acceleration of convolutional neural network inference.

This approach largely includes receiving a machine learning processing job, executing the machine learning processing job using parallel processing of multiple output pixels each cycle by walking data across processing elements with broadcast weights within regions and executing parallel multiplication operations, and generating an output indicating whether the machine learning processing job was successful or failed. In some embodiments, a schedule of actions is generated for respective machine learning processing jobs. The schedule of actions may include any of a plurality of shift operations in a many to many arrangement or a one to many arrangement, shifting data across region boundaries, fetching data and weights from a memory and distribution thereof to a plurality of regions (e.g., weights are distributed to respective weight memories which subsequently broadcasts those weights in a specified order based on a schedule of actions, and where data is distributed to respective processing elements). In some embodiments, a plurality of multiply and accumulate operations are performed in parallel at each processing element within a region, with each multiply and accumulate operation is executed in parallel operates on a data item stored at a respective processing element in a region and a single weight that is broadcast to each processing element in the region. In some embodiments, respective processing elements perform a plurality of multiply and accumulate operations for the same pixel and channel using a partial sum generated at that same processing element.

Other additional objects, features, and advantages of the invention are described in the detailed description, figures, and claims.

BRIEF DESCRIPTION OF FIGURES

In order that the present invention is better understood, some embodiments of the invention will now be described, by way of example only, with reference to the accompanying drawings.

FIG. 3 illustrates a flow for processing machine learning jobs by walking data across processing elements according to some embodiments.

DETAILED DESCRIPTION

Embodiments of the present invention provide an approach for a method, product, and apparatus for a multidimensional processing array for hardware acceleration of convolutional neural network inference.

In some embodiments, the approach is executed to perform inferencing using a machine learning model. In some embodiments, the approach is executed on or using a plurality of processing elements arranged into a plurality of regions and having additionally resources on a region by region basis for storing and broadcasting weights and for controlling the operation of the processing elements. For example, each processing element includes a controller for controlling operation of the elements within the region (e.g., shared weight memory and processing elements) such as by controlling movement of data values between processing elements, and/or broadcasting a weight within a region to each processing element for parallel execution of multiply and/or accumulate operations.

Figure 1:
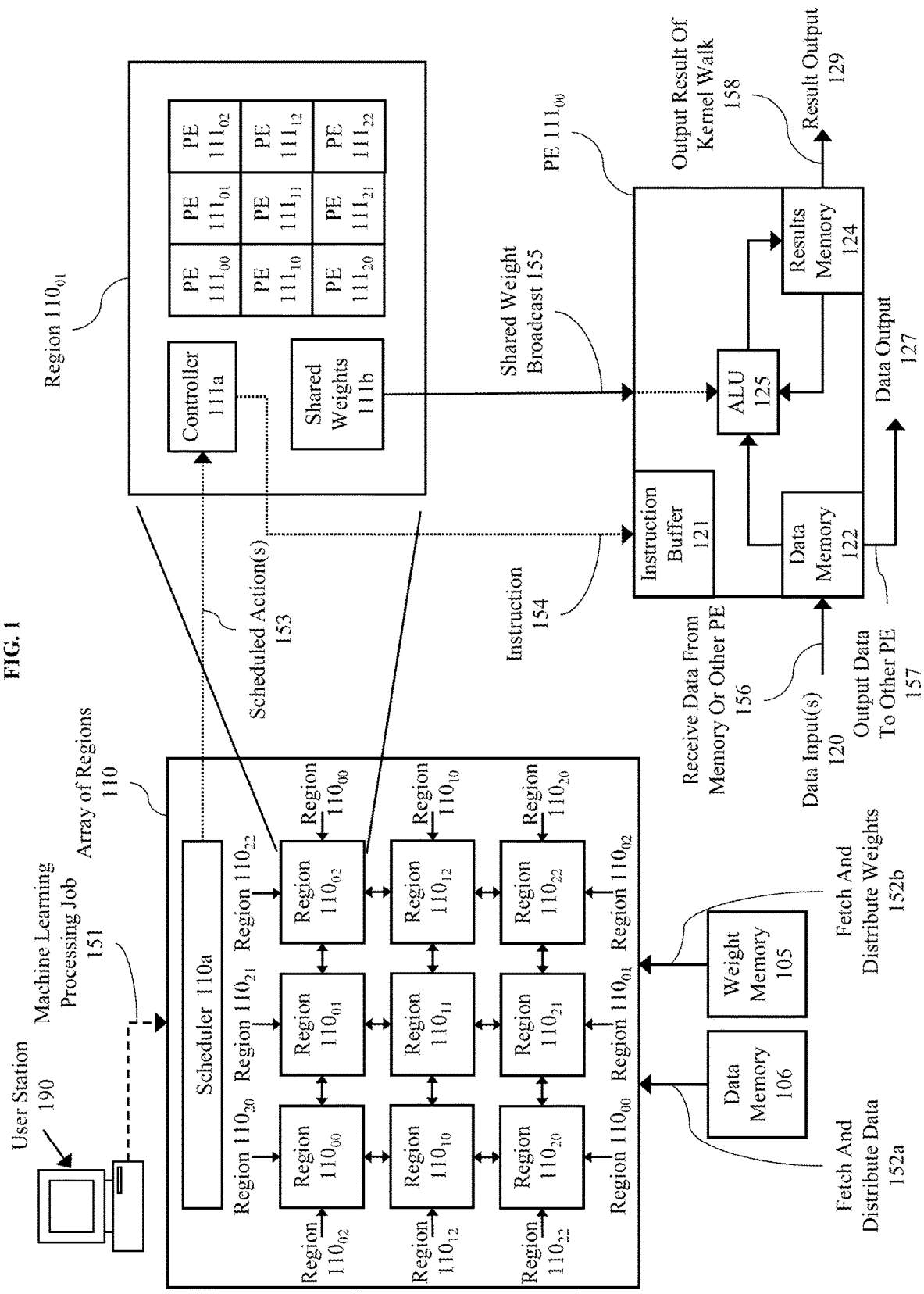
FIG. 1 depicts an example arrangement of an approach for a multidimensional processing array for hardware acceleration of convolutional neural network inferencing according to some embodiments.

FIG. 1 depicts an example arrangement of an approach for a multidimensional processing array for hardware acceleration of convolutional neural network inferencing according to some embodiments. Generally, the approach includes providing a plurality of regions, where each region has a plurality of processing elements, and each processing element includes an arithmetic logic unit (ALU).

In some embodiments, a user station 190 provides a machine learning processing job 151 (e.g., an image) to be processed using a model of a trained convolutional neural network at an array of regions 110. The user station 190 comprises any type of computing station that is useable to operate or interface with a database or other computing device, such as one that might store, perhaps temporarily, or hold a machine learning processing job. Examples of such user stations include workstations, personal computers, phones, tablets, or remote computing terminals. In some embodiments, the user station 190 comprises a display device, such as a display monitor, for displaying a user interface to a user at the user station. In some embodiments, the user station 190 also comprises one or more input devices for the user to provide operational control over the user station, such as a mouse, keyboard, or touch screen to manipulate a graphical user interface from which a user input might be received.

Generally, for a machine learning processing job each data value will correspond to one or more weights which may in turn correspond to different channels. These weights are used for multiply and accumulate operations at processing elements. For example, each data value is multiplied by a respective weight in each multiply accumulate operation—e.g., data value X is multiplied by a first corresponding weight and accumulated with a result from a previous multiply and accumulate operation until all weights and data are processed for a given pixel on a particular channel. These may then be used for a next phase of the machine learning processing job—such as for processing in a subsequent convolution layer of a trained neural network, pooling, and/or activation. Pooling has multiple different variants that are generally directed towards combining values. For example, pooling can comprise any combination of max/average operations on a 2×2, 3×3, etc., sets of data with any number of different strides. Additionally, one or more activation functions might be utilized on the data—e.g., ReLu, ReLu6, Tanh, Sigmoid, and element-wise operations on the results. These operations are made possible at least in part because each processing element is created such that the processing element can execute a number of instructions such as addition, subtraction, multiplication, division, and logical operations such as greater then, less then, or equal to.

As illustrated, the array of regions 110 has multiple components including nine regions $110_{00\text{-}22}$, a scheduler 110a, and may be connected to a data memory 106 and a weight memory 105. Each region is connected to its neighbor regions—e.g., region $110_{11}$ is connected to regions $110_{01}$, $110_{12}$, $110_{21}$, and $110_{10}$ for exchanging data. Additionally, each region at the edge of the regions is connected to a respective region(s) at the other corresponding edge to form a torus—e.g., region $110_{10}$ is connected to region $110_{12}$ and vice versa, while region $110_{00}$ is connected to region $110_{20}$ and $110_{02}$ and vice versa.

Additionally, each region includes a plurality of processing elements, a controller and a memory for storage of shared weights. By way of illustration, representative region $110_{01}$ is illustrated to the right of FIG. 1. As can be seen in this example, region $110_{01}$ includes nine PEs $111_{00\text{-}22}$, a controller 111a, and a memory for storing shared weights 111b.

Applicant notes that other arrangement having different dimensions are also possible. For example, sixteen regions could be provided in a 4×4 grid with each region including a 7×7 arrangement of processing elements. Additionally, while arrangements having equal numbers of regions along each dimension are generally preferred, they are not required for the practice of the disclosed approach. Moreover, while the illustration in FIG. 1 discloses a 2-dimensional arrangement, multidimensional arrangements can also be provided which include different plains. For example, results for different channels could be computed on different planes with each plane implementing its own independent walk and/or each plane exchanging data with other planes. In such an embodiment, each region might have more than four neighbors. Similarly, multiple different chips could be connected together (dynamically or otherwise) to create a multi-chip solution. Additionally, these arrangements can be combined with a pipelining approach where different sets of regions (e.g., on different chips) can process different layers of a convolutional neural network (CNN) inference job in a pipelined fashion.

In some embodiments, the array of regions is coupled to and/or includes a data memory 106 and a weight memory 105. In some embodiments, the data memory 106 and the weight memory 105 may be provided using the same underlying storage device(s), whereas in other embodiments, the data memory 106 and the weight memory 105 are provided by separate physical storage devices. In some embodiments, an image or machine learning processing job 151 is received from user station 190 and stored in the corresponding data and weight memory storage locations (as used herein, a machine learning processing job may include at least an image for processing). In some embodiments, the memory for data and weights is provided with multiple read and/or write ports. The data and weight memory may be populated with the necessary data and weights to execute a machine learning processing job using any relevant technique.

The array of regions 110 receives input data and corresponding weights from the data and weight memory. This information is then distributed to the different regions by the scheduler 110a. For example, the scheduler 110a receives information for the machine learning processing job and determines (or receives information representing) how data and corresponding weights should be distributed across the regions. This distribution plan can then be implemented by fetching and distributing data 152a and weights 152b in combination with some scheduled action (see 153) to distribute relevant portions to each region (e.g., to store the correct weights in the shared weights 111b for each region and to populate each PE with the correct input data). In some embodiments, a controller at each respective region might distribute a respective data value to each corresponding PE in the region using an instruction 154 to storage said value—e.g., the same instruction but different data values. As will become clear in the discussion of subsequent figures. The data stored in array of regions 110 can be used to provide at least some of the necessary data and weights to other processing elements from respective processing elements without resorting to accessing the data memory 106 and/or weight memory 105. This can mitigate some memory bottlenecks. Additionally, for machine learning processing jobs that are of sufficient size, one array of regions could be provided data/weights during one period, while another array of regions is provided data/weights during a subsequent period while the first array of regions is processing what it received during the first period.

An example PE $111_{00}$ is represented in the lower right-hand side of FIG. 1. According to some embodiments, the PE includes an instruction buffer 121, a data memory 122, an ALU 125, and a results memory 124. The instruction buffer 121 receives an instruction at 154. This may comprise a current instruction, or an instruction to execute at or over subsequent cycles. The output of the instruction buffer can be used as or for generation of control signals to control the operation of the elements in the PE. Data memory 122 is normally provided for storage of input data from some data input(s) 120 which could be received from memory (e.g., data memory 106) or from a neighboring PE (see 156). As will be discussed further below, the PEs on the edge of the region may receive data values from PEs in neighboring regions. Additionally, data memory 122 provides a data output 127 that can similarly be used to provided data to other PEs (see output data to other PE 157). In some embodiments, the ALU 125 operates on data from the data memory 122, a weight from the shared weights at 111b (e.g., a shared weight broadcast to each PE within a respective region at 155). The ALU 125 is also connected to a results memory 124 for storage of a result of a current computation and/or for accumulation of a previously generated result with a newly calculated result. For example, a value from the data memory 122 could be multiplied by a weight and then accumulated with a previously generated result to implement a multiply and accumulate operation. In some embodiments, the results may be output to a memory at 129 (see output results of kernel walk 158). Furthermore, in some embodiments, the results output 129 could be routed to a data input on another PE. One such use case could be a pooling operation where the output at 129 comprises the larger, smaller, or average of two values retrieved from the data memory, from the data input(s) 120, from the results memory, or some combination thereof. As will be discussed further in regard to FIGS. 2A-B, PEs may be interconnected in various manners for receiving and transmitting data, weights, and/or results.

Figure 2B:
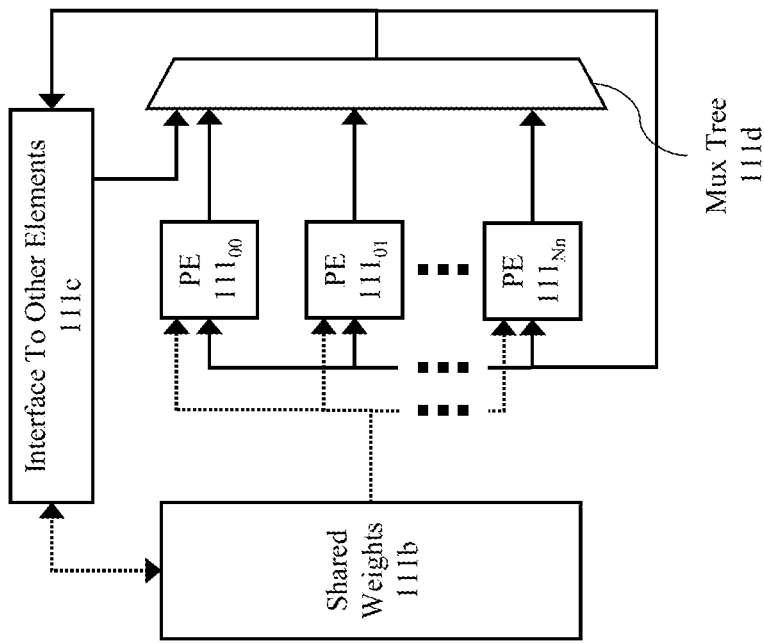
FIGS. 2A-B depict example arrangements of processing elements within a region according to some embodiments.
Figure 2A:
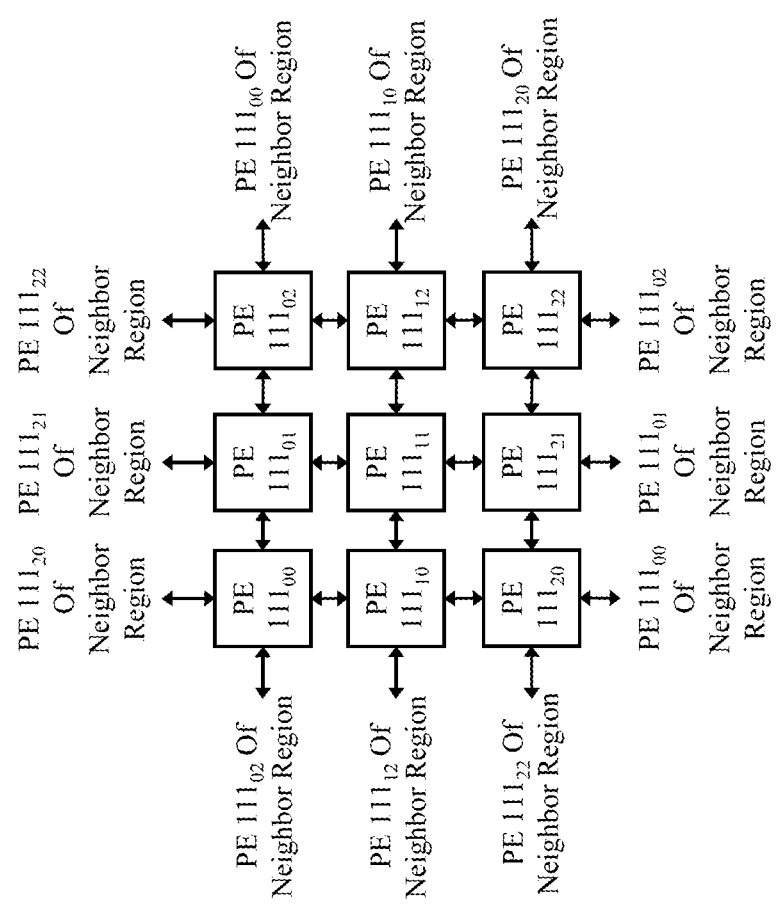

FIGS. 2A-B depict example arrangements of processing elements within a region according to some embodiments. While illustrated separately, the arrangements and their interconnections can be provided in a single embodiment, where a various control signals are used to select how information is routed.

FIG. 2A illustrates an interconnection arrangement of the example region from FIG. 1 that includes nine PEs. These PEs are connected to their neighbors in the region and to neighbors from neighboring regions. As illustrated, the region includes nine PEs organized in a 3×3 grid. However, other arrangements could be provided such as a 10×10, 50×50, 100×50, 100×75, or any other arrangement.

Each PE is connected to four other PEs. Here, the four other PEs can be thought of as the left, right, top, and bottom neighbors. For some PEs one or more neighbors are actually in other regions (see PEs $111_{00\text{-}02}$, $111_{10}$, $111_{12}$, and $111_{20\text{-}22}$), whereas PE $111_{11}$ only has neighbors within the same region. Additionally, if the number and arrangement of PEs within a region are different, the number of PEs connected only to neighbors within the region may also change. For instance, if the region comprises a 7×7 arrangement of PEs, then twenty PEs will be connected to one PE in a different region, twenty five PEs will be connected only to PEs within the same region, and four PEs will be connected to two PEs that are in different regions. Additionally, as illustrated, each connection between PEs can be used to route data in either direction. In some embodiments, each PE has a fixed routing direction for routing data (e.g., pixel data) between PEs.

FIG. 2B illustrates another interconnection arrangement of the example region from FIG. 1 that includes nine PEs. These PEs are connected to their neighbors in the region or neighboring regions using a broadcast approach. As illustrated, the region includes processing elements 00-Nn connected via at least a tree structure or other routing elements (e.g., mux tree).

Shared weights 111b for the region are illustrated as being connected to each PE ($111_{00\text{-}Nn}$) within the corresponding region. In some embodiments, a respective shared weight from the shared weights 111b can be broadcast to each PE in the region at the same time. In some embodiments, each PE might receive a different weight as needed within the region from the shared weights 111b.

An output or data value of single PE might also be routed to the remainder of PEs within the array—e.g., a value from PE $111_{00}$ is routed to PEs $111_{01\text{-}Nn}$. Likewise, the output or data value from a PE in one region might be routed to a PE in another region via the interface 111*c*. One way to manage this routing is with a mux tree (see 111*d*).

With the combination of the FIG. 2A embodiment, and the FIG. 2B embodiment a kernel-based approach for partially connected layers and a fully connected approach can be processed in an efficient manner.

FIG. 3 illustrates a flow for processing machine learning jobs by walking data across processing elements according to some embodiments. Generally, the process starts when a machine learning processing job is received. The machine learning processing job is then executed using the array of regions by walking data across processing elements according to some embodiments as disclosed herein. Finally, a message indicating success or failure is generated.

The process starts at 300 where a machine learning processing job is received. The machine learning processing job might be received from a user device (e.g., user station 190) either directly or indirectly. For example, the user station 190 might comprise an image or a set of images for processing to perform an inference task. For instance, a previously defined neural network model might be represented by a plurality of layers having a specific configuration of weights. A processing job might comprise an image to be processed with a particular trained neural network to determine if the image is of the thing or type of thing the neural network was trained on.

At 304 the machine learning process is executed using parallel processing of multiple output pixels each cycle by walking data across processing elements and using a weight. This will be discussed further below. Briefly, the process will generate/identify a schedule of actions which might comprise shifting data from one to many processing elements or shifting data across processing elements in a many to many arrangement. Along with each shift operation instructions are executed at each processing element to determine a partial sum for a given pixel. In this way, multiple values are computed in parallel with a latency that corresponds directly to the number of operations that are necessary as opposed to a number of cells when using a systolic array. In some embodiments, this process is combined with broadcasting the same weight to a plurality of processing elements in the same region.

At 306 a machine learning processing job success/failure message is generated. In some embodiments, the message comprises a direct indication that the processing job was completed successfully or that the processing job failed. In some embodiments, a success message is represented by a message that moves or provides the result(s) of the machine learning processing job or indicates that the results of the machine learning processing job are ready/available.

Figure 4:
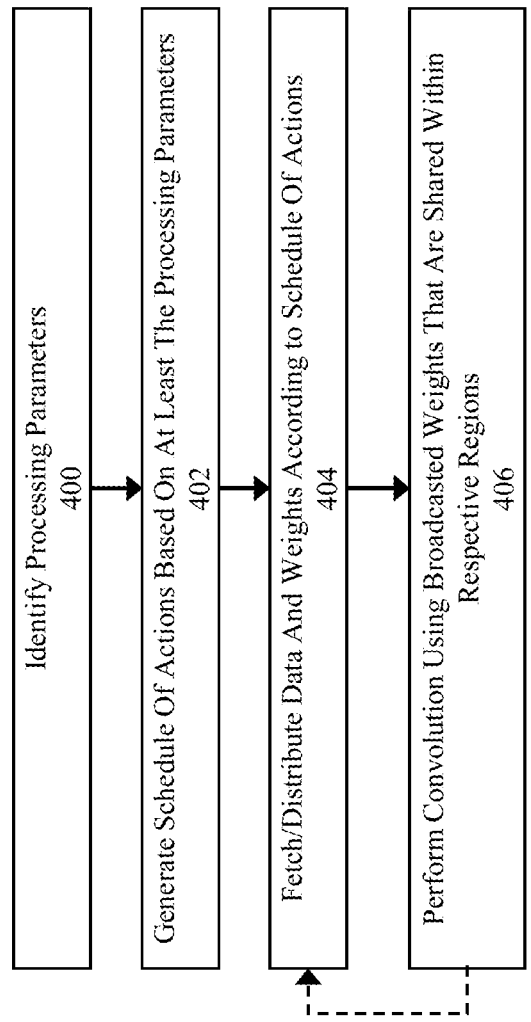
FIG. 4 illustrates an example process flow corresponding to the block titled execute machine learning process using parallel processing of multiple output pixels each cycle by walking data across processing elements as illustrated in FIG. 3 according to some embodiments.

FIG. 4 illustrates an example process flow corresponding to the block titled execute machine learning process using parallel processing of multiple output pixels each cycle by walking data across processing elements as illustrated in FIG. 3 according to some embodiments. Generally the process is implemented using a plan as to how to perform the operations to complete the machine learning processing job that can move around the input data in the array of regions without requiring that the same input data be fetched repeatedly and without requiring transformation and duplication of data in preparation of processing that data as required for a systolic array.

At 400 relevant processing parameters are identified. These parameters might be further divided into two types. A first type for the machine learning processing job (e.g., kernel size, image size, whether the corresponding model is fully or partially connected), and a second type for the for the available arrangement(s) available for executing the processing job (e.g., number and arrangement of processing elements, number of planes, whether pipelining is available, number and arrangement of chips/arrays of regions). These parameters are then used at 402 to generate a schedule of actions. For example, a given machine learning processing job might fit within a single array of regions, but only for a single channel at a time. Thus, the schedule might comprise processing a first channel for each pixel, and then processing subsequent channels for each pixel. Additionally, the schedule of actions could identify the walk to be executed for the pixels, when and to where data and weights are read into the array, the specific pooling and activation functions to be executed and so on.

At 404 the data setup phase is performed to provide each region with the correct data and weights at the correct locations. For example, data inputs are read from the data memory 106 and respective weights are loaded into a first register in each respective processing element in each respective region, while weights are read from the weight memory 105 and into each of the shared weight memories as necessary. This puts each relevant region of the array of regions into the correct state to implement the main computation portion for a given layer of a machine learning model used to complete the inference job at 406. This process will be discussed further below. Briefly this serves perform the convolution on the data using the weights in a manner where within a given region a weight is broadcast to each processing element some number of times to complete the convolution.

Figure 5:
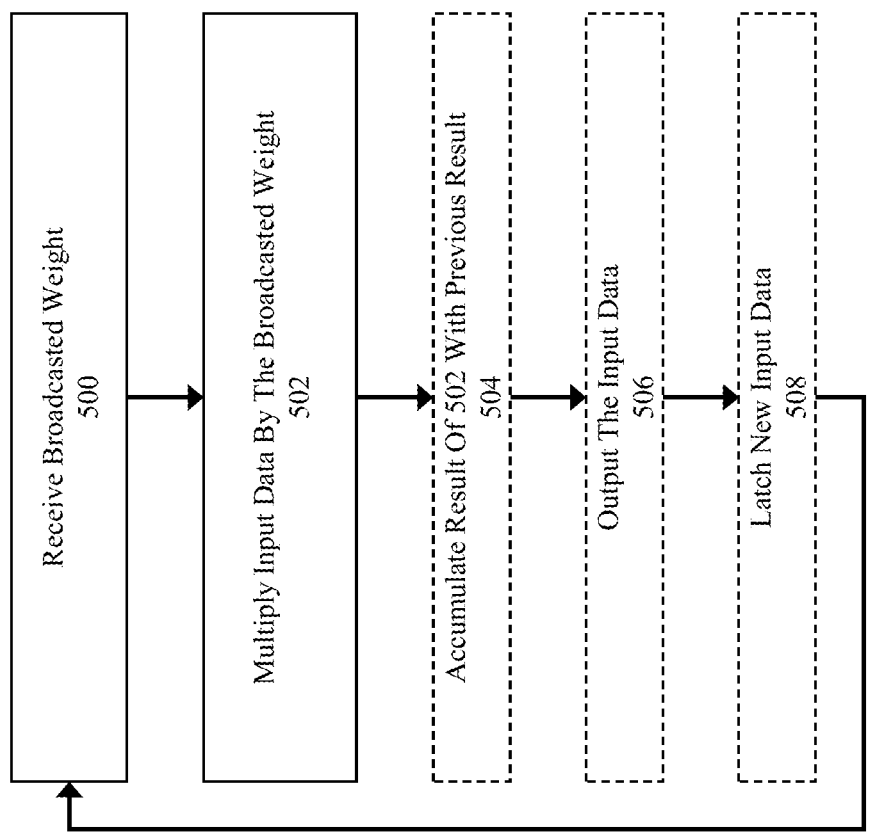
FIG. 5 illustrates an example process flow corresponding to the block titled perform convolution using broadcasted weights that are shared within respective regions as illustrated in FIG. 4 according to some embodiments.

FIG. 5 illustrates an example process flow corresponding to the block titled perform convolution using broadcasted weights that are shared within respective regions as illustrated in FIG. 4 according to some embodiments. Generally, each processing element performs a multiply and accumulate operation on its current input data before passing its current input data to a new processing element while also received new input data from another node.

In some embodiments, the process starts at 500 where a weight is broadcast to each PE in each region. This weight is then used by each PE in that region to multiply with their current input data at 502 and accumulated at 504 with a previous result if the multiply operation is not the first for the current channel being computed.

In some embodiments, when there are additional multiply and accumulate operations to be completed for a given input channel, the respective current input data from each PE will be output from each PE at 506 which form the input data to be latched into the PE at 508. In this way the data to be operated on can be passed from PE to PE without fetching the data from a memory every time that value is needed.

This process will continue until some condition has been met such as a kernel walk has been completed for the particular channel and pixel combination that is being operated on within the region. This idea and how the input data and weights are broadcast is illustrated further in the example below.

FIGS. 6A-6I illustrate an example process flow for a kernel walk at processing elements within a region according to some embodiments.

As an initial mater, the process parameters here comprise at least a kernel of 3×3 and a PE arrangement of 5×5. Similarly, a kernel walk plan is provided for a 3×3 kernel. However, if the kernel is a different size, the kernel walk plan would likewise be different. Alternatively, instead of a kernel walk plan as illustrated here, a broadcast approach could be used as discussed in regard to FIG. 2B. FIGS. 6A-6I illustrate a kernel walk implementation. A kernel walk pattern comprises an ordered sequence of steps such that each data value for each pixel will visit each processing element within its respective neighborhood. With a 3×3 kernel, one possible walk plan comprises: right, down, left, left, up, up, right, right. Additionally, as provided here, the data arrangement and weight arrangement are in corresponding positions. Thus, the walk plan can logically be thought of as applying to the shared weights 605 in the inverse. Thus, a walk plan specifically for the shared weights to maintain consistency can be thought of as: left, up, right, right, down, down, left, left. This is because, as illustrated, we move our singular selection point across the weight matrix whereas we move each piece of data in the region. Each of the shared weights is represented by a letter A-I where those letters might correspond to any of the same or different values.

Figure 6A:
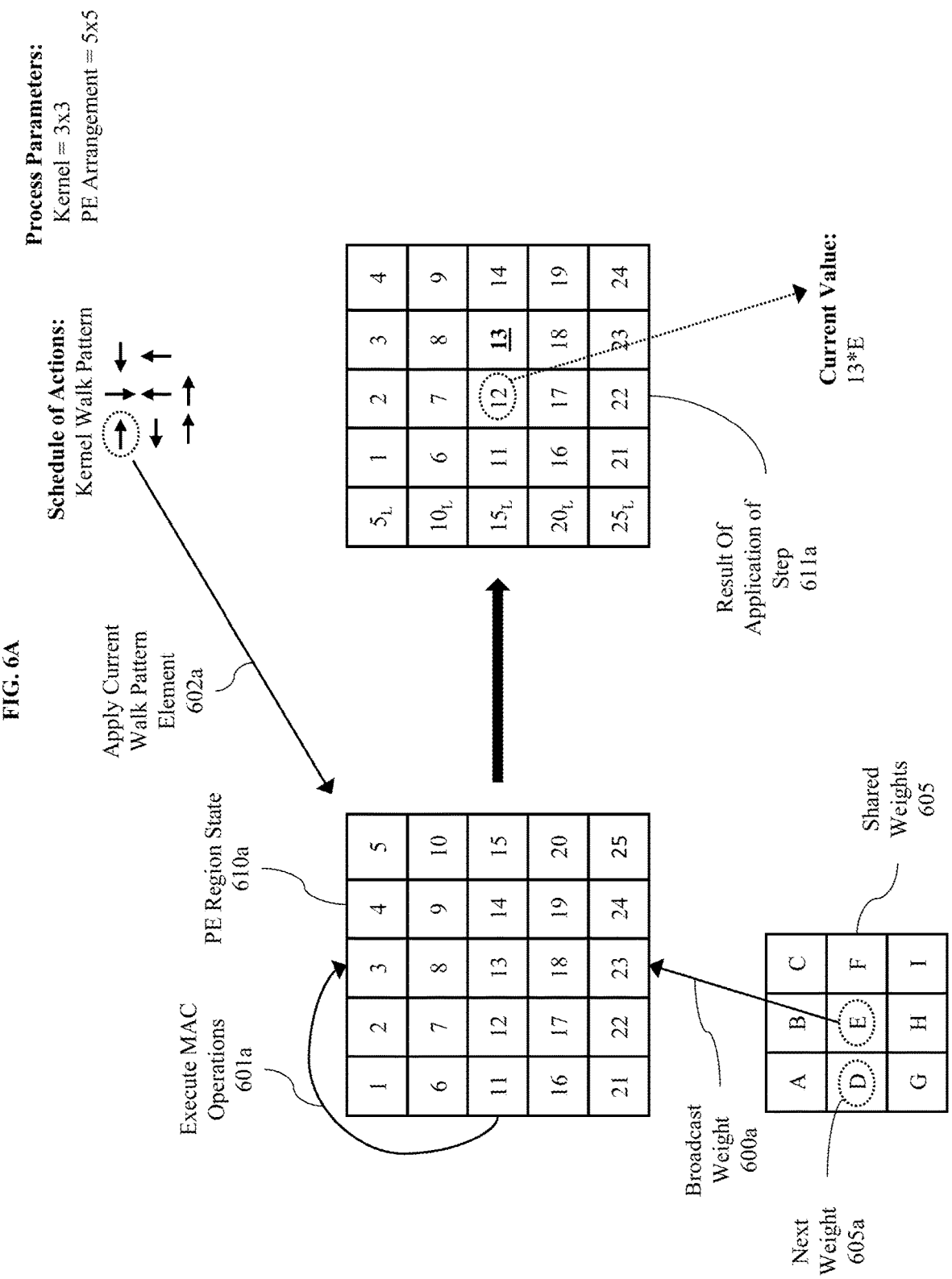
FIGS. 6A-6I illustrate an example process flow for a kernel walk at processing elements within a region according to some embodiments.

FIG. 6A illustrates an initial condition of PEs in a region and a result of a multiple and accumulate operation and the completion of a step in the kernel walk plan.

The PE region state 610a represents a single data value at each PE within the region. Here for the sake of understanding, those data values are represented by 1-25, with the initial state being illustrated at 610a.

The process starts at 600a by broadcasting the same weight to each PE in the region. Here that E is broadcast to each PE in region 610a.

At 601a a multiply and accumulate operation is executed. Because this is the first multiplication the accumulation is either not performed or is accumulated with zero. Thus, the central PE would provide the result 13*E. Similarly, each PE would generate a result that comprises that PEs data value*E. However, we will only track the center PE in this discussion.

At 602a the current action for the kernel walk plan is performed. Here that comprises shifting the data item (but not the running sum) to the right by one PE. Here this would result in 5, 10, 15, 20, and 25, being moved out of the region. These values would instead be provided as inputs to a neighboring region. This happens in our current region as well, where 5, 10, 15, 20, and 25 from a neighbor on the left of the current region are input into the corresponding PEs at the left edge. Here the subscript L represents that that is the corresponding data value from the neighbor on the left. This is illustrated at 611a. Additionally, 611a illustrates that for the central PE, the data identified as 13 has already been computed as part of the partial sum. We represent this here by underlining.

The next weight to be used is also identified at 605a. This weight will be applied to the results 611a which are represented as 610b in FIG. 6B.

Figure 6B:
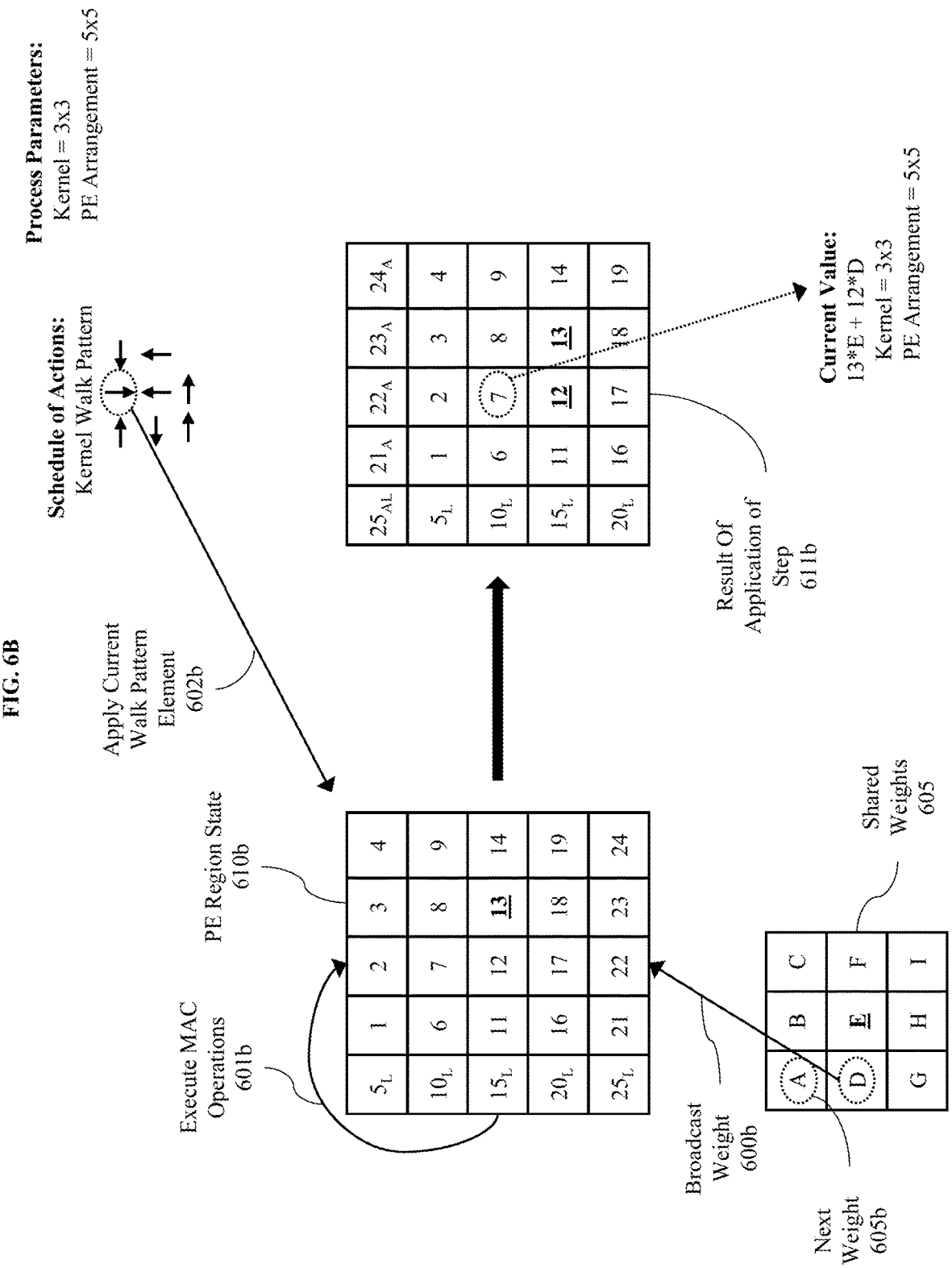
Figure 6C:
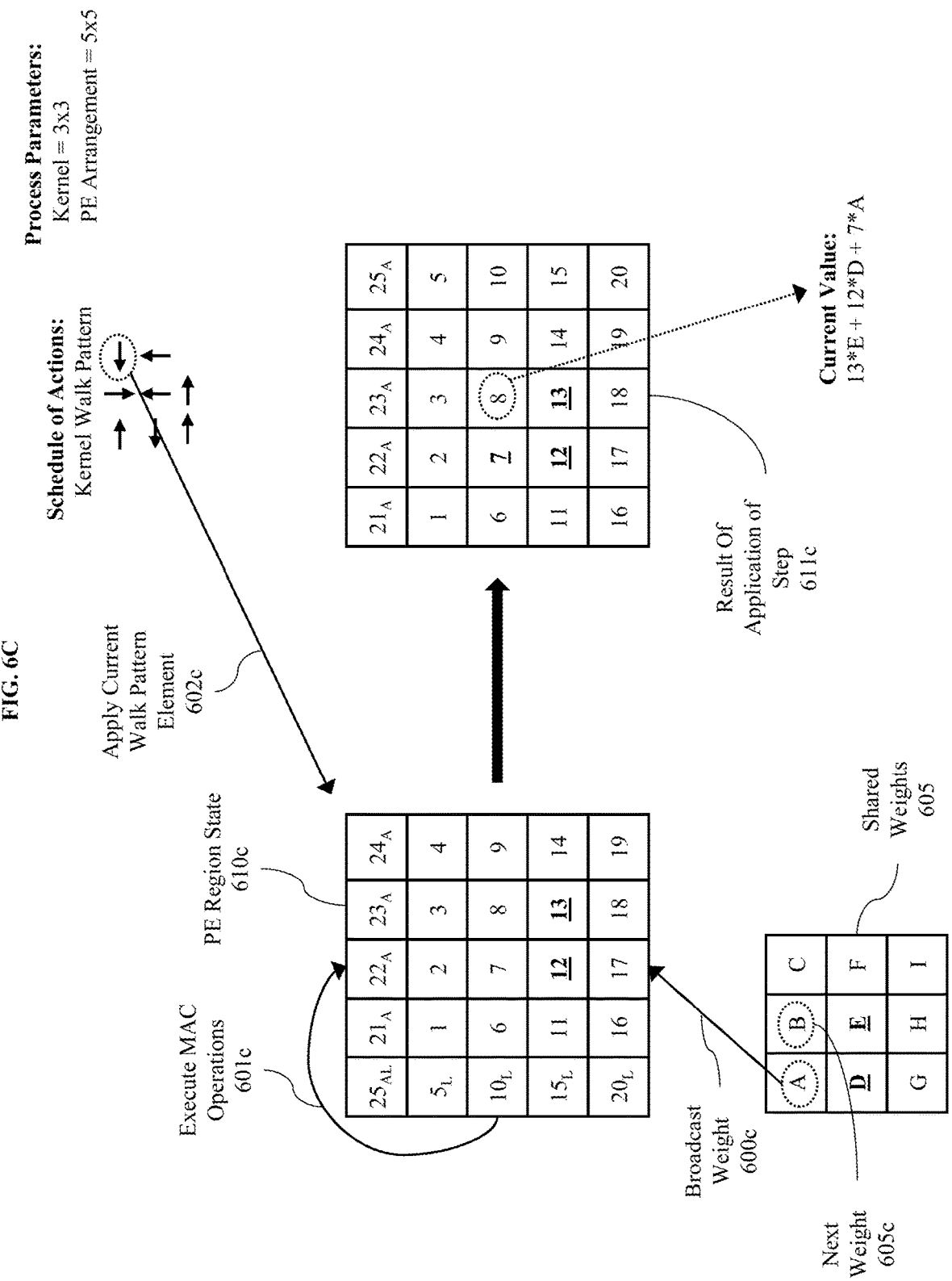
Figure 6D:
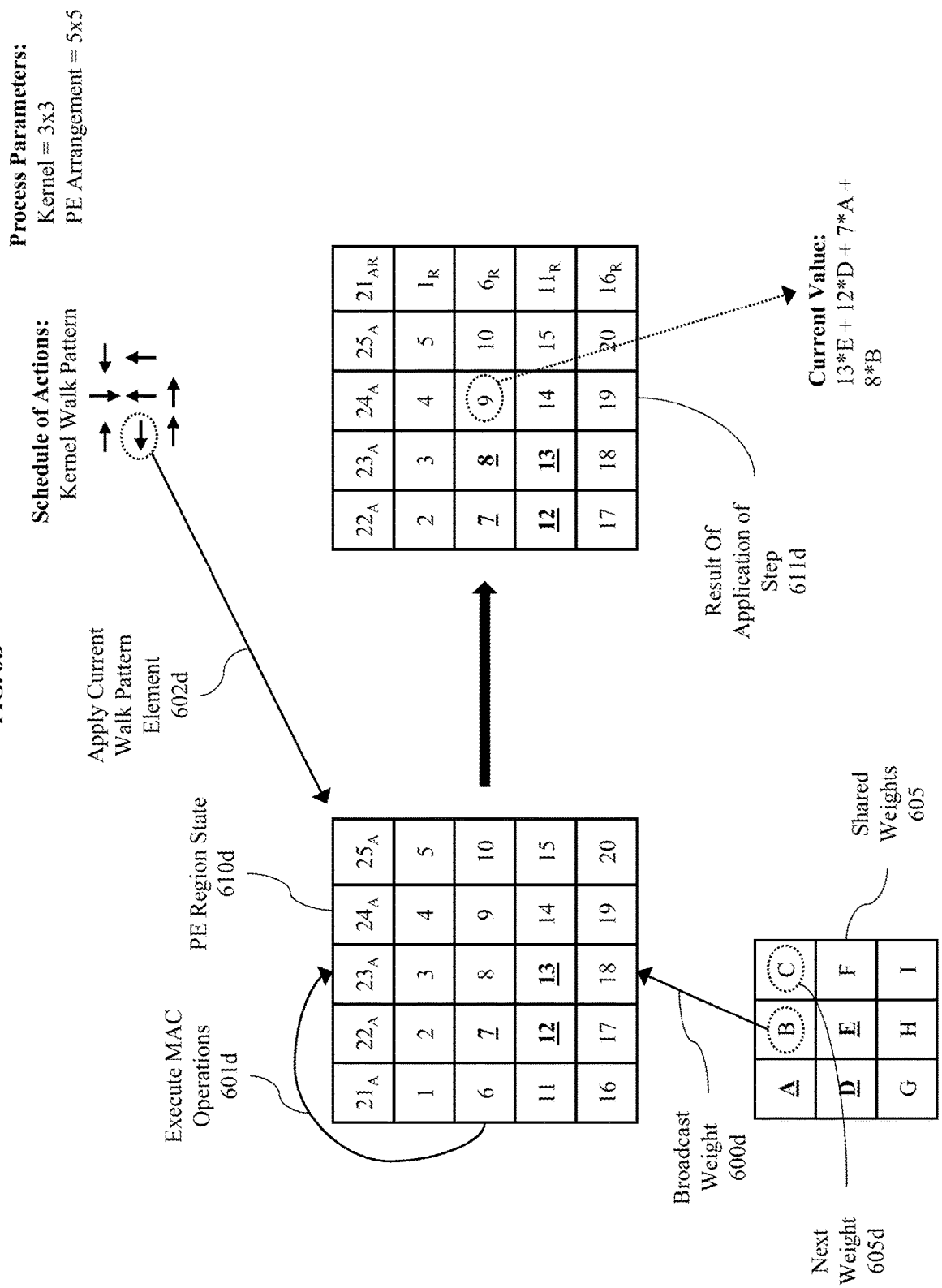
Figure 6E:
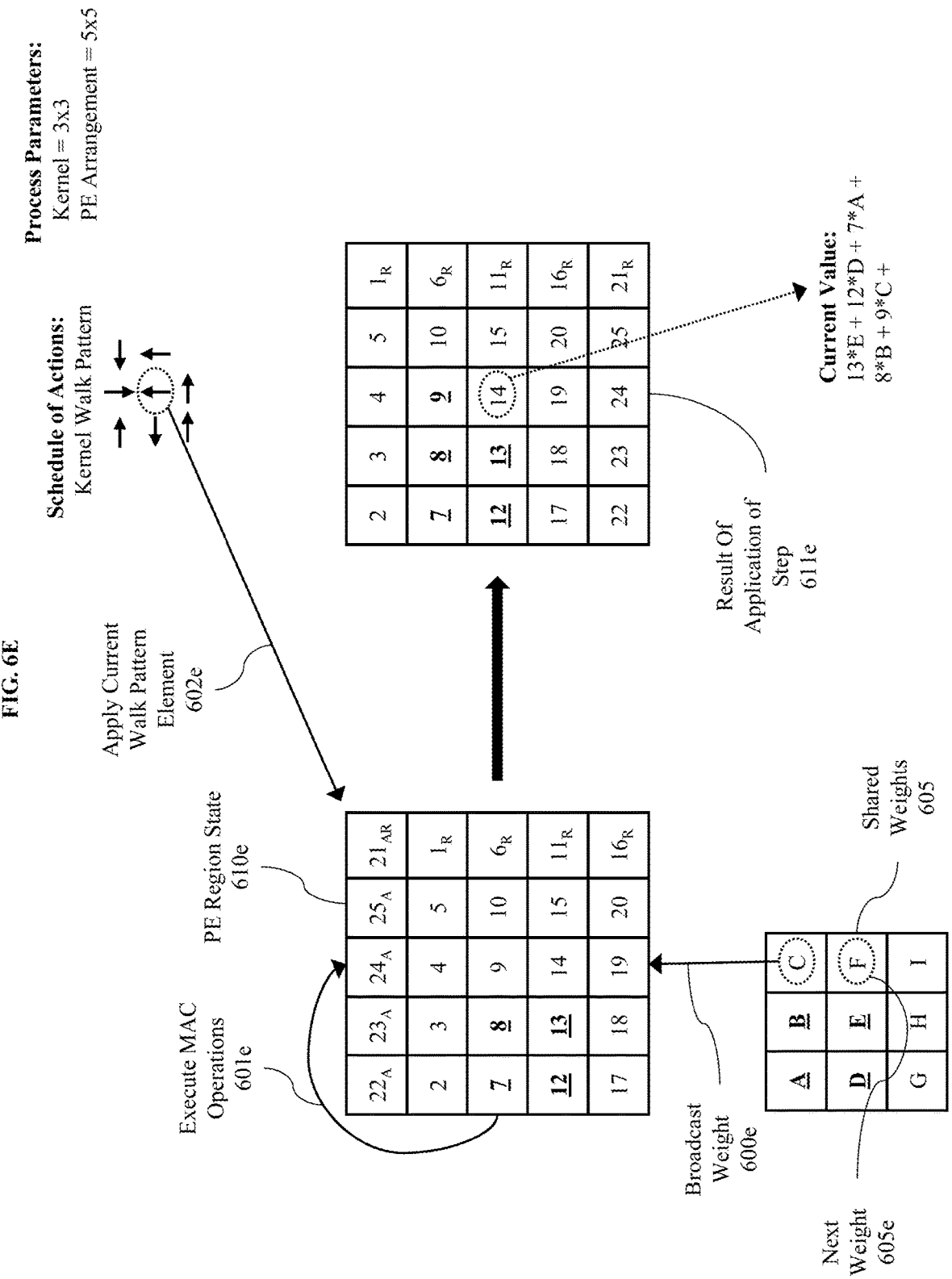
Figure 6F:
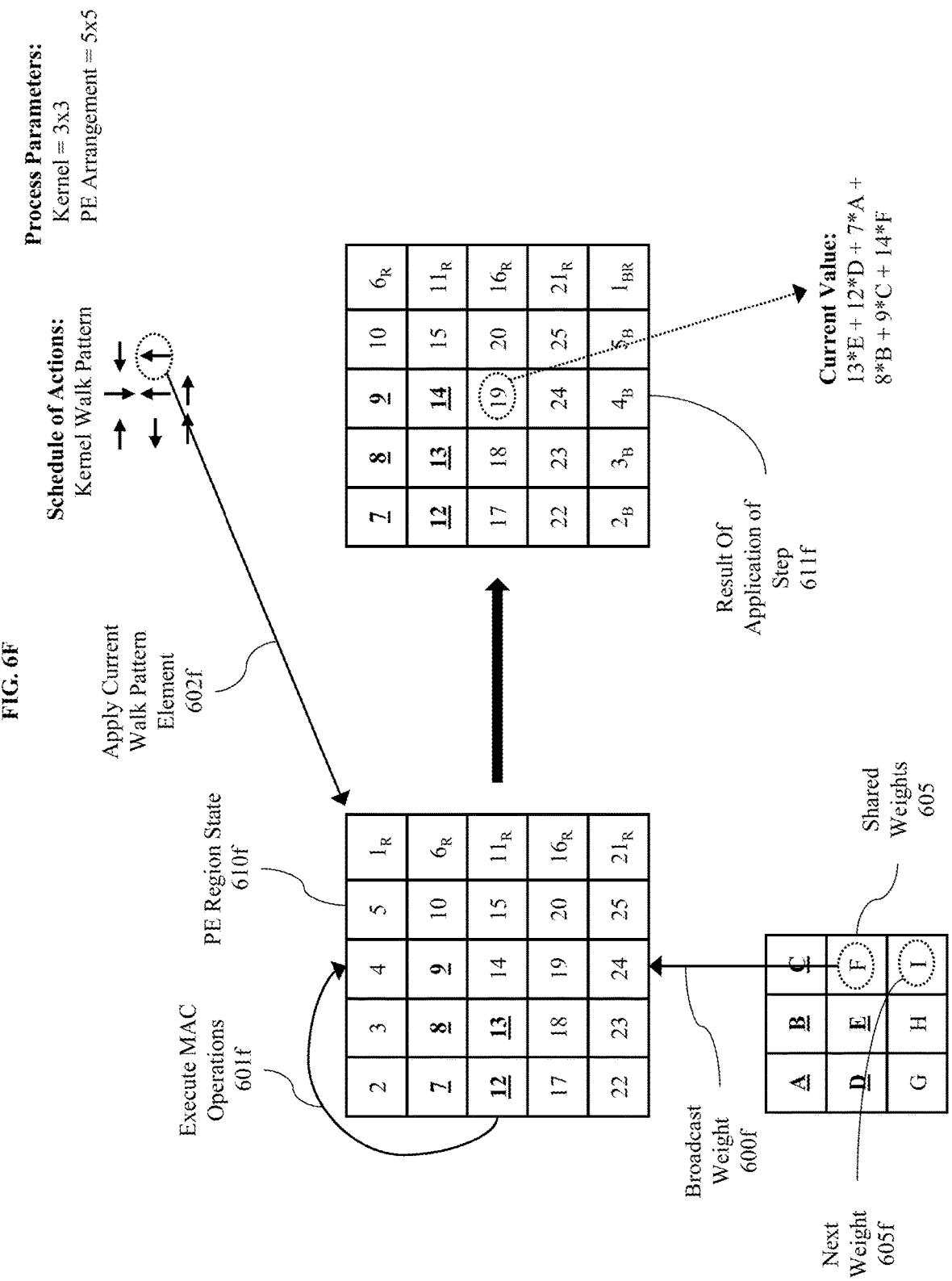
Figure 6G:
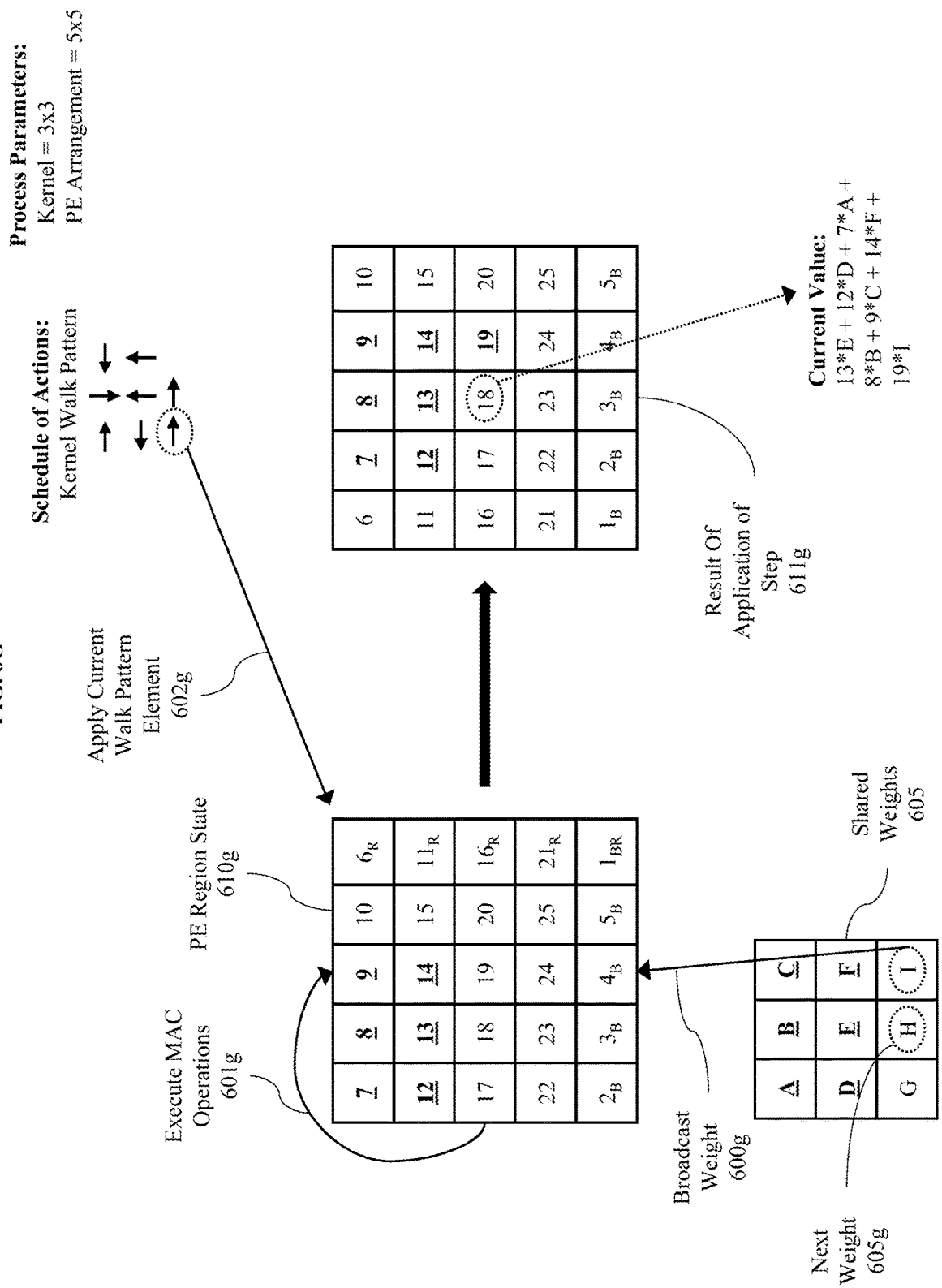
Figure 6H:
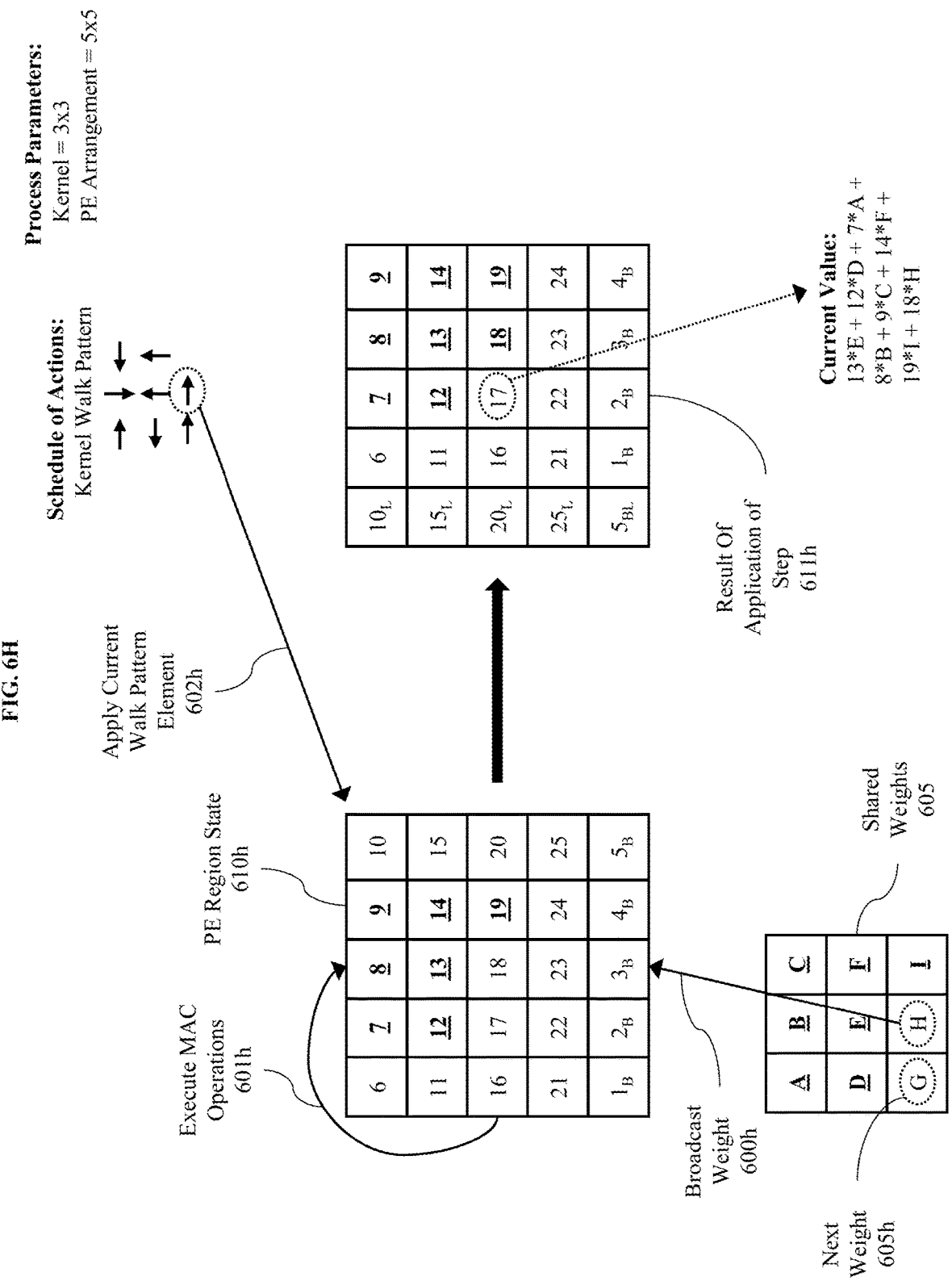
Figure 6I:
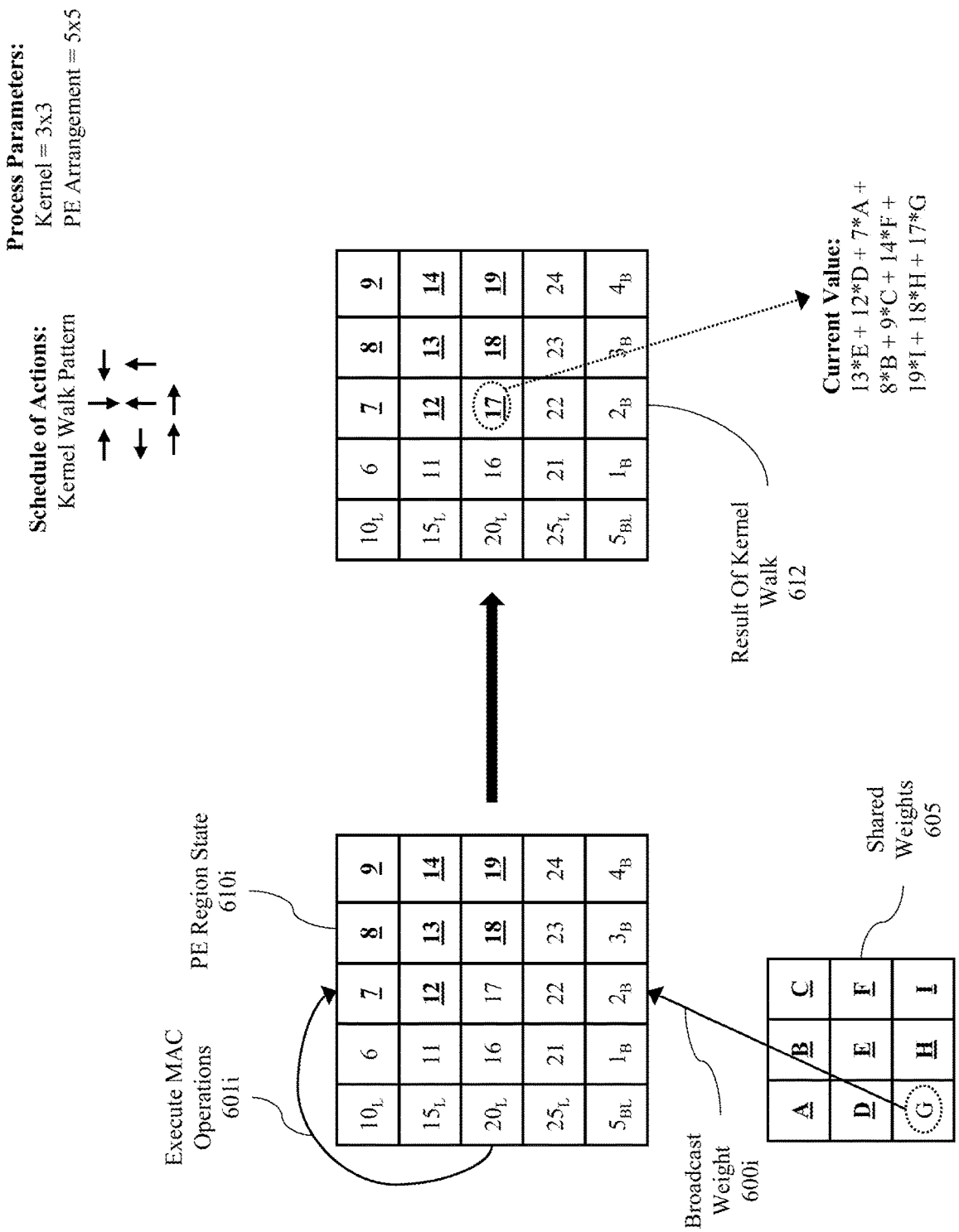

In FIG. 6B the weight E has been underlined to indicate that it has already been used. Here, the previously identified next weight 605a is used as part of a multiply and accumulate operation for each PE. Which changes our partial sum from 13*E to 13*E+12*D.

This is performed by broadcasting the weight D at 600b, executing multiply and accumulate operations at 601b, applying the next step in the walk pattern at 602b, and identifying the next weight at 605b. The result of the walk is provided at 611b.

FIGS. 6C-I continue with the same flow as FIG. 6B. Where the previously identified next weight 605h is used as part of a multiply and accumulate operation for each PE. Which changes our partial sum from 13*E+12*D sequentially be modified to also include 7*A, 8*B, 9*C, 14*F, 19*I, 18*H, and 17*G.

This is performed by broadcasting the weight D, A, B, C, F, I, H, G in order at 600c-i, executing multiply and accumulate operations at 601c-i using the corresponding broadcasted weight, applying the corresponding next step in the walk pattern at 602c-h, and identifying the corresponding next weight at 605c-h. The result of each of the corresponding walk steps is provided at 611c-h.

The final resulting state on the region is illustrated at 612. Since the multiply and accumulate operations complete at 601i is the last operation there are no more kernel walk steps to be take. Thus, the result of the kernel walk is illustrated at 612.

Figure 7:
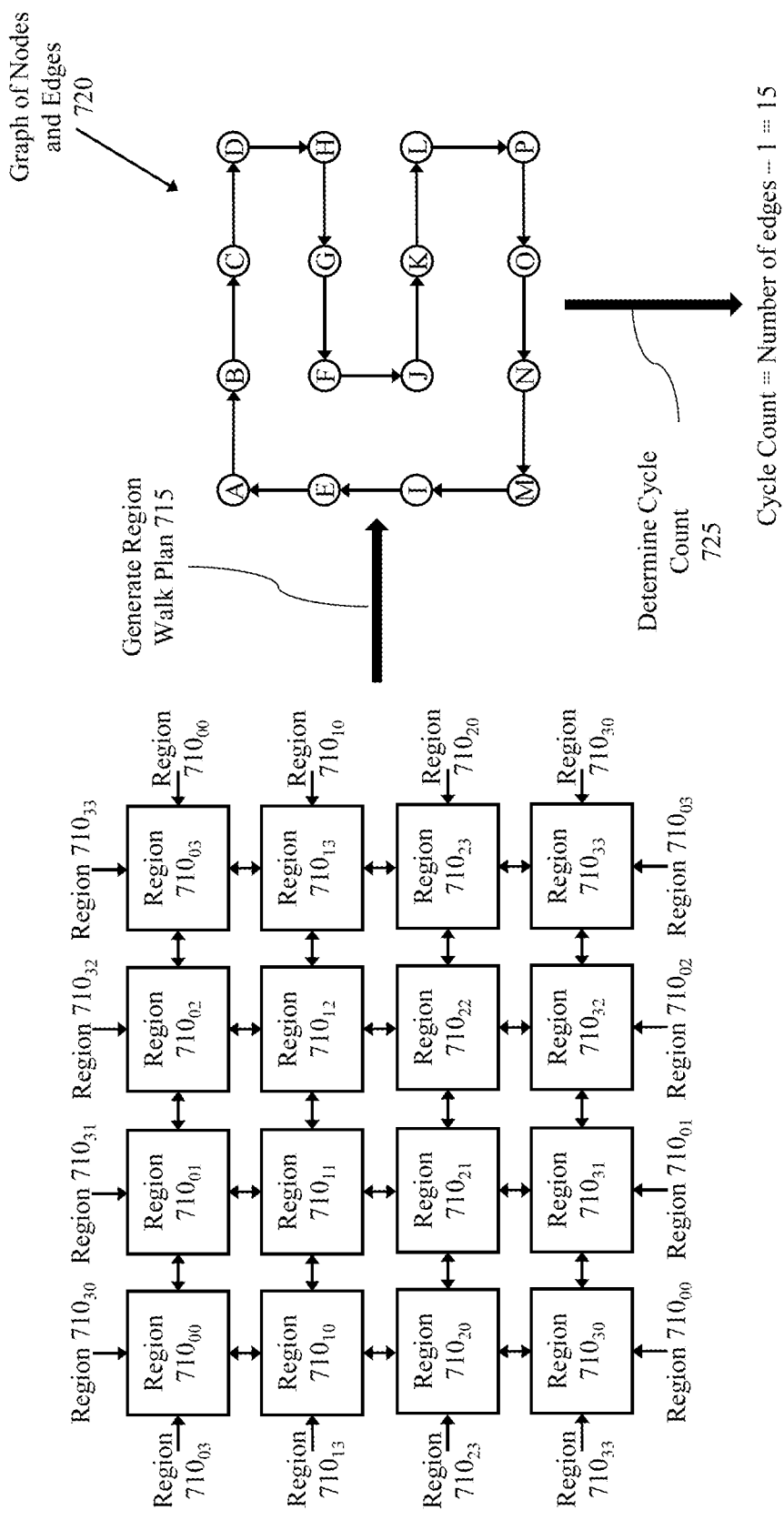
FIG. 7 illustrates generation of a region walk plan according to some embodiments.

FIG. 7 illustrates generation of a region walk plan according to some embodiments. Because the size of machine learning processing jobs and the arrangement and channels for jobs differ, the region walk plan may be more easily generated dynamically. Generally, when the channel that one region is computing is different from a channel that another region is computing, all the data for each region can be processed by walking the data between regions. FIG. 7 provides an illustrative examine of such an extreme case.

For instance, 16 regions are provided ($710_{00-33}$) where each region computes a different channel. Thus, the data in each region can be processed by moving that data through each region. In order to accomplish this, a walk plan is generated at 715. This may be performed by generating a graph of nodes and edges 720 where each region is represented by a node (A-P) and the movement of data from one region to another is along the path indicated each region cycle. The example here includes 15 cycles as determined at 725.

As one would understand, multiple regions, planes, or arrays of regions or chips might be used for each channel. Thus, data might be moved from multiple regions to another set of multiple regions as a group while maintaining positional relationships. Likewise, this could occur for place, arrays of regions, or chips.

System Architecture Overview

Figure 8:
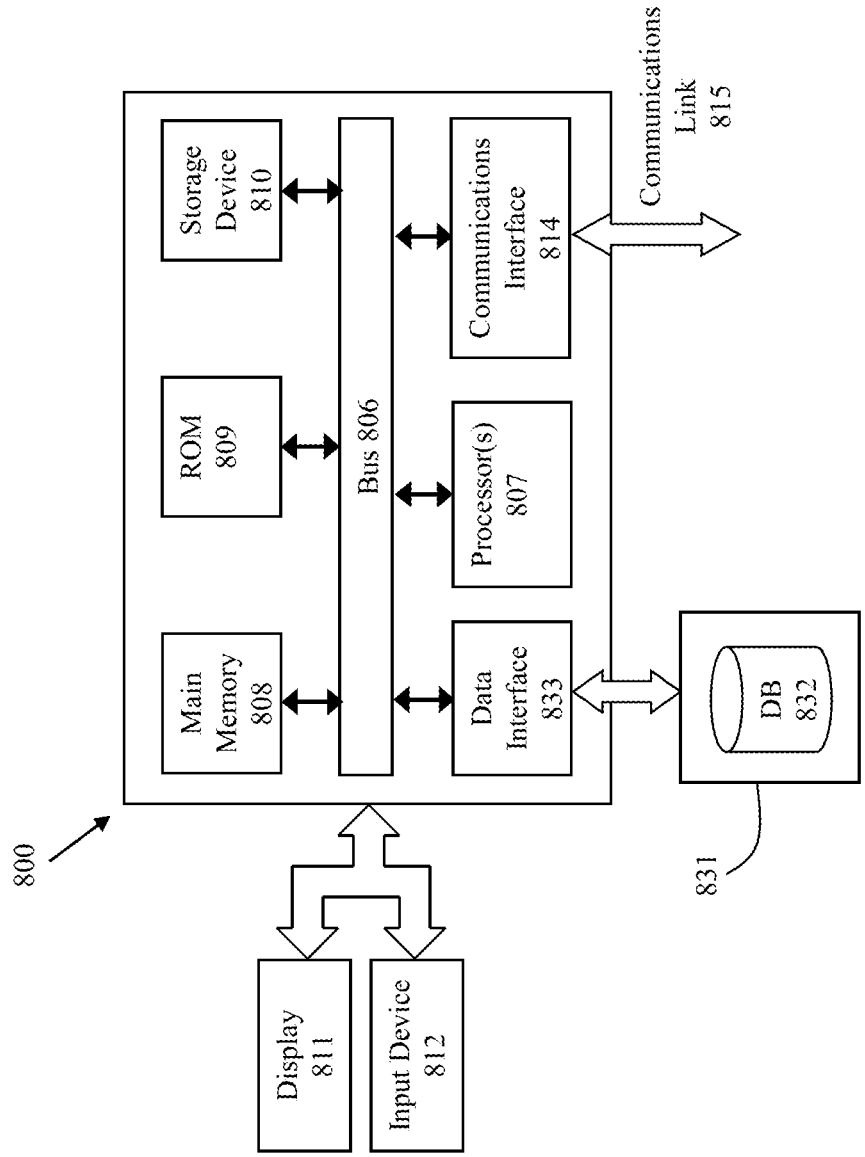
FIG. 8 shows an architecture of an example computing system with which the invention or parts of the invention may be implemented.

FIG. 8 shows an architecture of an example computing system with which the invention or parts of the invention may be implemented.

Computer system 800 includes a bus 806 or other communication mechanism for communicating information, which interconnects subsystems and devices, such as processor 807, system memory 808 (e.g., RAM), static storage device (e.g., ROM 809), storage device 810 (e.g., magnetic or optical disk drives), communication interface 814 (e.g., modem or Ethernet card), display 811 (e.g., CRT or LCD), input device 812 (e.g., keyboard), and cursor control.

According to one embodiment of the invention, computer system 800 performs specific operations by processor 807 executing one or more sequences of one or more instructions contained in system memory 808. Such instructions may be read into system memory 808 from another computer readable/usable medium, such as ROM 809 or storage device 810. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as storage device 810. Volatile media includes dynamic memory, such as system memory 808.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 800. According to other embodiments of the invention, two or more computer systems 800 coupled by communication link 815 (e.g., LAN, PTSN, or wireless network) may perform the sequence of instructions required to practice the invention in coordination with one another.

Computer system 800 may transmit and receive messages, data, and instructions, including program, i.e., application code, through communication link 815 and communication interface 814. Received program code may be executed by processor 807 as it is received, and/or stored in storage device 810, or other non-volatile storage for later execution. Computer system 800 may communicate through a data interface 833 to a database 832 on an external storage device 831.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

Thus, disclosed here is a method product and apparatus for providing an improved solution that does not suffer, or does not suffer to the same extent, to the same issues as a systolic array such as decreasing the latency, multiplier unit utilization, and wasted memory bandwidth, overhead, and by maintaining more benefits with scaling.

What is claimed is:

1. A machine learning apparatus, comprising:
   an array of regions;
   a plurality of processing elements in each region of the array of regions;
   a plurality of shared weight memories, wherein each region includes a respective shared weight memory of the plurality of shared weight memories that is coupled to the plurality of processing elements in a corresponding region; and
   wherein a machine learning processing job is executed using parallel processing of multiple output pixels during a cycle at least by walking data across processing elements and broadcasting a single weight in a corresponding shared weight memory to a plurality of processing elements within the corresponding region for use in performing parallel multiplication operations, and an output indicates whether the machine learning processing job was successful or failed.

2. The machine learning apparatus of claim 1, wherein a scheduler generates a schedule of actions based on processing parameters for executing the machine learning processing job.

3. The machine learning apparatus of claim 2, wherein the schedule of actions includes a plurality of shift operations in a many to many arrangement or a one to many arrangement.

4. The machine learning apparatus of claim 3, wherein the many to many arrangement shifts data across region boundaries.

5. The machine learning apparatus of claim 1, wherein weights are distributed to respective shared weight memories of the plurality of shared weight memories that are shared for processing elements within a respective region and wherein individual weights are broadcast from a respective shared weight memory to a corresponding plurality of processing elements within the respective region based on at least a schedule of actions.

6. The machine learning apparatus of claim 1, wherein a machine learning processing job is executed using parallel processing of multiple output pixels during the cycle comprises at least performing a plurality of multiply and accumulate operations in parallel at each processing element within the corresponding region, wherein each multiply and accumulate operation that is executed at the same time operates on a data item stored at a respective processing element in the corresponding region and the single weight that is broadcast to each processing element in the corresponding region.

7. The machine learning apparatus of claim 1, wherein a processing element performs a plurality of multiply and accumulate operations for the same pixel and channel using a partial sum generated at that same processing element.

8. A method, comprising:
   receiving a machine learning processing job;
   executing the machine learning processing job using parallel processing of multiple output pixels during a cycle at least by walking data across processing elements and broadcasting a single weight in a corresponding shared weight memory to a plurality of processing elements within a corresponding region for use in performing parallel multiplication operations, wherein each region of a plurality of regions includes a plurality of processing elements and a respective shared weight memory of a plurality of shared weight memories that is coupled to the plurality of processing elements in the corresponding region; and
   generating an output indicating whether the machine learning processing job was successful or failed.

9. The method of claim 8, wherein a schedule of actions is generated based on processing parameters for executing the machine learning processing job.

10. The method of claim 9, wherein the schedule of actions includes a plurality of shift operations in a many to many arrangement or a one to many arrangement.

11. The method of claim 10, wherein the many to many arrangement shifts data across region boundaries.

12. The method of claim 8, wherein weights are distributed to respective weight memories that are shared for processing elements within a respective region and wherein individual weights are broadcast from a respective shared weight memory to a corresponding plurality of processing elements within the respective region based on at least a schedule of actions.

13. The method of claim 8, wherein executing the machine learning processing job using parallel processing of multiple output pixels during the cycle comprises at least performing a plurality of multiply and accumulate operations in parallel at each processing element within the corresponding region, wherein each multiply and accumulate operation that is executed at the same time operates on a data item stored at a respective processing element in the corresponding region and the single weight that is broadcast to each processing element in the corresponding region.

14. The method of claim 8, wherein a processing element performs a plurality of multiply and accumulate operations for the same pixel and channel using a partial sum generated at that same processing element.

15. A non-transitory computer readable medium, having stored thereon a set of configuration information for configuring a gate array or generating an application specific integrated circuit, the set of configuration information, when implemented performs a set of acts, the set of acts comprising:

receiving a machine learning processing job;

executing parallel processing of the machine learning processing job, wherein the parallel processing operates on multiple output pixels using a shared weight during a corresponding cycle at least by broadcasting a single weight in a corresponding shared weight memory to a plurality of processing elements within a corresponding region and data is walked across processing elements after the corresponding cycle, wherein each region of a plurality of regions includes a plurality of processing elements and a respective shared weight memory of a plurality of shared weight memories that is coupled to the plurality of processing elements in the corresponding region; and generating an output indicating whether the machine learning processing job was successful or failed.

16. The computer readable medium of claim 15, wherein a schedule of actions is generated based on processing parameters for executing the machine learning processing job and a processing element performs a plurality of multiply and accumulate operations for the same pixel and channel using a partial sum generated at that same processing element.

17. The computer readable medium of claim 16, wherein the schedule of actions includes a plurality of shift operations in a many to many arrangement or a one to many arrangement.

18. The computer readable medium of claim 17, wherein the many to many arrangement shifts data across region boundaries.

19. The computer readable medium of claim 15, wherein weights are distributed to respective weight memories that are shared for processing elements within a respective region and wherein individual weights are broadcast from a respective shared weight memory to a corresponding plurality of processing elements within the respective region based on at least a schedule of actions.

20. The computer readable medium of claim 15, wherein the machine learning processing job executed using parallel processing of multiple output pixels during the corresponding cycle comprises at least performing a plurality of multiply and accumulate operations in parallel at each processing element within the corresponding region, wherein each multiply and accumulate operation that is executed at the same time operates on a data item stored at a respective processing element in the corresponding region and the single weight that is broadcast to each processing element in the corresponding region.

* * * * *